United States Patent
Matsuoka

(10) Patent No.: US 6,802,558 B2
(45) Date of Patent: Oct. 12, 2004

(54) REAR BODY STRUCTURE FOR VEHICLE BODY

(75) Inventor: Hidenori Matsuoka, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 10/278,994

(22) Filed: Oct. 24, 2002

(65) Prior Publication Data
US 2003/0102696 A1 Jun. 5, 2003

(30) Foreign Application Priority Data
Oct. 31, 2001 (JP) ........................................ 2001-333787

(51) Int. Cl.$^7$ .............................................. B60R 27/00
(52) U.S. Cl. .............................. 296/203.04; 296/193.08
(58) Field of Search ........................ 296/203.04, 193.07, 296/193.08, 198, 204, 209, 187.08, 187.11

(56) References Cited

U.S. PATENT DOCUMENTS

| | | | | |
|---|---|---|---|---|
| 4,840,424 A | * | 6/1989 | Asoh | 296/204 |
| 5,102,187 A | * | 4/1992 | Harasaki | 296/204 |
| 5,174,628 A | * | 12/1992 | Hayatsugu et al. | 296/204 |
| 6,227,610 B1 | * | 5/2001 | Iwatsuki et al. | 296/204 |
| 2003/0080588 A1 | * | 5/2003 | Sakuma | 296/204 |

FOREIGN PATENT DOCUMENTS

| | | | | |
|---|---|---|---|---|
| JP | 402037085 A | * | 2/1990 | 296/204 |
| JP | 406270847 A | * | 9/1994 | 296/204 |
| JP | 11-078984 | | 3/1999 | |
| JP | 2000-238667 | | 9/2000 | |

* cited by examiner

*Primary Examiner*—Lori L. Coletta
(74) *Attorney, Agent, or Firm*—Nixon Peabody LLP; Donald R. Studebaker

(57) ABSTRACT

A rear body structure comprises a floor tunnel extending in a lengthwise direction from the front to the back of the vehicle body at a middle of a floor panel in a transverse direction, a floor tunnel reinforcement disposed along the floor tunnel so as to form a closed cross section between them, and a generally V-shaped gusset secured between the floor tunnel reinforcement and a package member interconnecting side walls between which a compartment is formed in the rear body.

7 Claims, 8 Drawing Sheets

REAR BODY STRUCTURE FOR VEHICLE BODY

BACKGROUND OF THE INVENTION

1. Field of the Invention

The present invention relates to a rear body structure for a vehicle and, more particularly, to a rear body structure for a rear body structure having a high-mount backbone frame.

2. Description of Related Art

There has been known vehicle bodies having what is called a high-mount backbone frame such as disclosed in, for example, Japanese Unexamined Patent Publication No. 2000-23 8667. The high-mount backbone frame, that is known as a floor tunnel reinforcement a floor tunnel reinforcement disposed on a floor extending in a lengthwise direction of a vehicle body at a central portion of a floor panel and forming a closed cross section between them. This type of floor tunnel reinforcement provides improvement of rigidity of the floor, and hence rigidity of the vehicle body, it is hard for the floor tunnel reinforcement to transmit an external load applied to the floor tunnel reinforcement to an upper body portion of the vehicle body upon an occurrence of a frontal collision or a rear-end collision. That is, the floor tunnel reinforcement is accompanied by a problem of a poor property of dispersing an external load.

On the other hand, as disclosed in, for example, Japanese Unexamined Patent Publication No. 11-78984, it has been proposed to improve the torsional rigidity of a vehicle body by installing a V-shaped reinforcement connected between a kick-up portion of a rear floor and an upper panel of a package compartment. However, there is no teaching regarding the property of dispersing an external load in the above mentioned publication.

SUMMARY OF THE INVENTION

It is therefore an object of the invention to provide a rear body structure for a vehicle body that realizes an improved property of dispersing an external load and high torsional rigidity of the vehicle body.

The foregoing object of the present invention is accomplished by a rear body structure comprising a floor tunnel extending in a lengthwise direction from the front to the back of the vehicle body at a middle of a floor pane! in a transverse direction of the vehicle body, a floor tunnel reinforcement disposed along the floor tunnel so as to form a closed cross section between them, a package member extending in the transverse direction so as to interconnect side walls between which a compartment is formed in the rear body, and a gusset, preferably a generally V-shaped gusset, secured to the floor tunnel reinforcement and the package member so as thereby to interconnect the floor tunnel reinforcement and the package member. According to the rear body, as the floor tunnel reinforcement, as a rigid structural member, and the package member are connected by the gusset, an external load applied to the floor tunnel reinforcement is transmitted to an upper body portion of the vehicle body through the gusset and the package member, so as to improve the property of dispersing an external load applied to the vehicle body In addition, the floor tunnel reinforcement improves the rigidity of both vehicle floor and vehicle body. Furthermore, the gusset provides an increase in the torsional rigidity of the vehicle body.

The rear body structure further comprises a bracket that is disposed between and secured to the floor tunnel reinforcement and the generally V-shaped gusset. The generally V-shaped gusset may be preferably shaped so as to form a closed cross section between the floor tunnel reinforcement. This structure improves fitting suitability and assembling workability of the generally V-shaped gusset.

The rear body structure further comprises a cross member forming a closed cross section extending in said transverse direction. This provides a double closed section structure at the joined section between the generally V-shaped gusset and the cross member, so as to improve rigidity of the joined section.

The generally V-shaped gusset preferably has a gusset reinforcement such as a bead, running the entire length thereof. This generally V-shaped gusset is enhanced in its own rigidity, so as to increase external load transmission efficiency and torsional rigidity of the vehicle body.

The comprises generally V-shaped gusset may comprise two mating gusset halves each of which preferably has a gusset reinforcement such as a bead running the entire length thereof.

BRIEF DESCRIPTION OF THE DRAWINGS

The above and other objects and features of the present invention will be understood from the following description of a specific embodiment thereof when considering in conjunction with the accompanying drawings, in which.

DETAILED DESCRIPTION OF THE SPECIFIC EMBODIMENT

Figure 1:
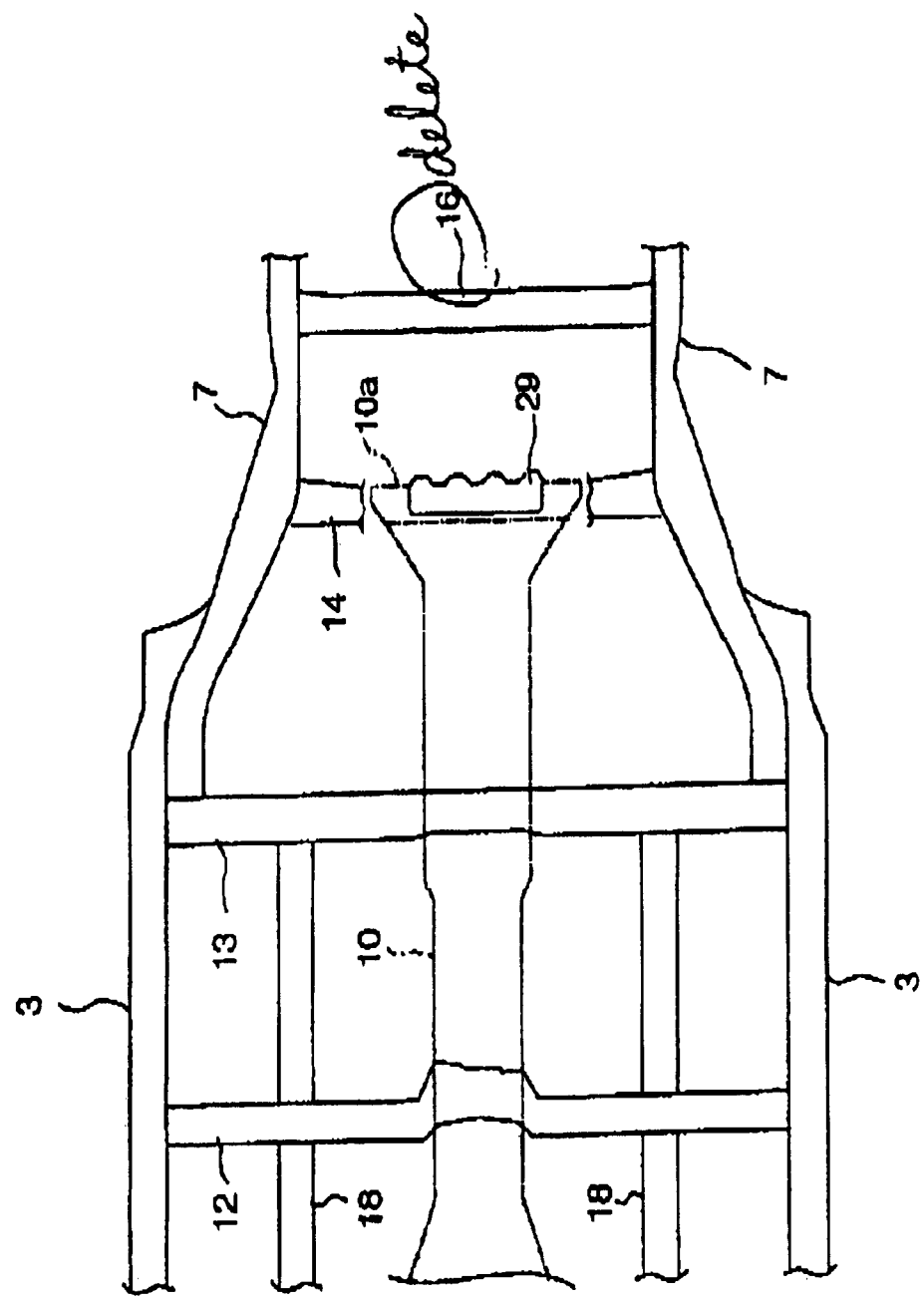
FIG. 1 is a plan view of a rear body structure according to an embodiment of the present invention in which a floor panel is omitted.
Figure 2:
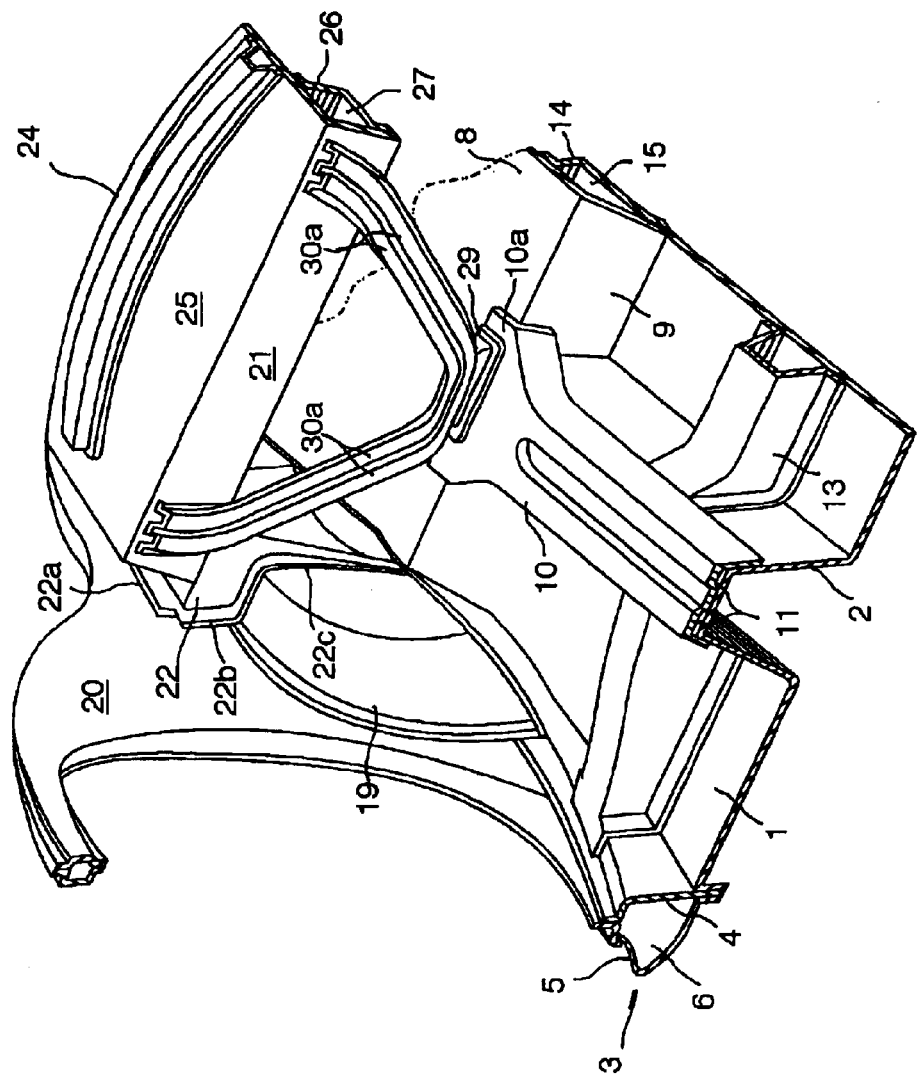
FIG. 2 is a perspective view of the rear body structure.
Figure 3:
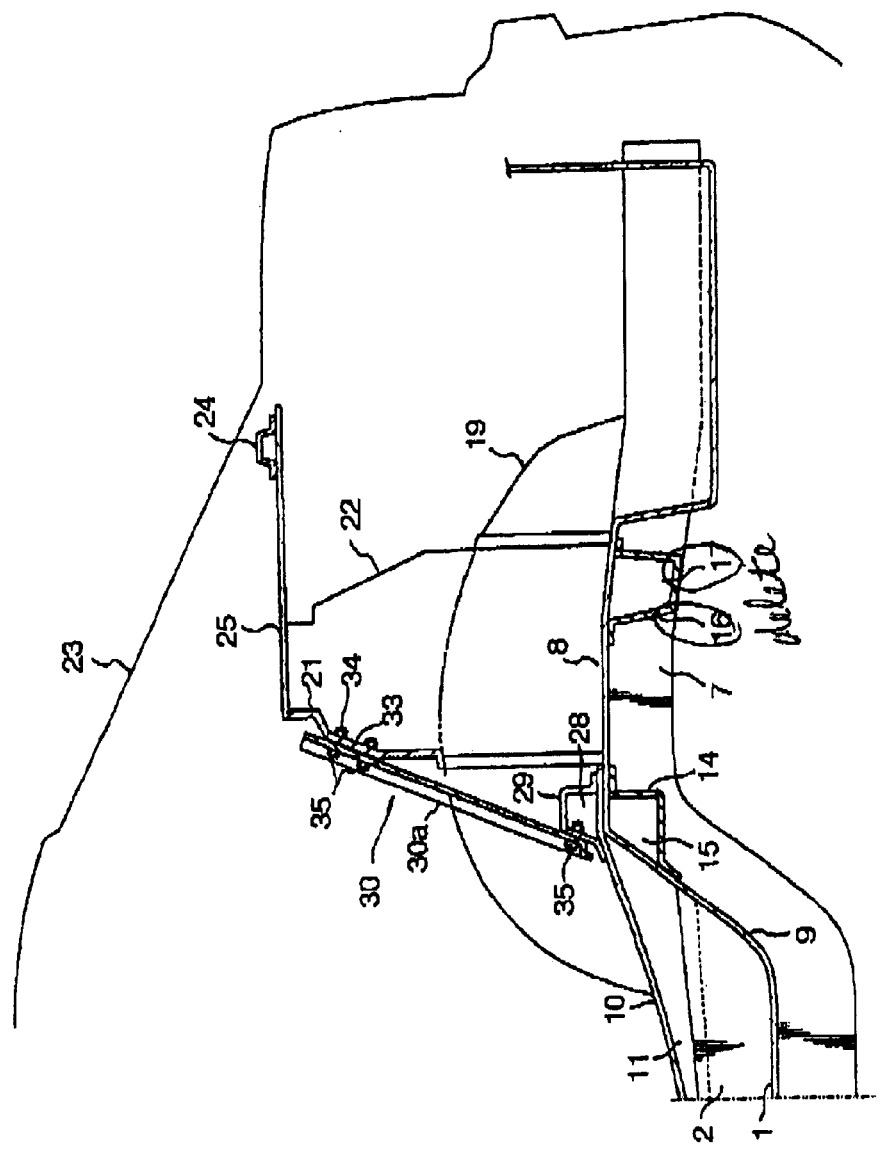
FIG. 3 is a side view of the rear body structure.

Referring to the drawings in,detail, and, in particular to FIGS. 1 to 3 showing a rear body for a vehicle body according to an embodiment of the present invention, a center floor panel 1 has a convex floor tunnel 2 located in the middle of the floor panel in a transverse direction of a vehicle body and extending in a lengthwise direction from the front to the back of the vehicle body and side sills 3 located at opposite sides of the vehicle body and extending in the lengthwise direction. Each of the side sills 3, that work as rigid structural members of the vehicle body, comprises inner side sill 5 and a outer side sill 5 welded, or otherwise secured, to each other so as to form a closed cross section 6 extending in the lengthwise direction. The rear body includes a rear side frame 7 extending rearward from a rear end portion of the side sill 3 and secured to the center floor panel 1 and a rear floor panel 8 from the under side so as to form a closed cross section between them. The rear floor panel 8 and the center floor panel 1 are connected to each other by a kick-up joint panel 9 so as thereby to form an integral floor panel. If necessary, a side sill reinforcement may be incorporated within the side sill 3.

A floor tunnel reinforcement 10, that is called a high-mount backbone frame, is provided. Specifically, the floor tunnel reinforcement 10 extends over the top of the floor tunnel 2 and is welded, or otherwise secured, to dash lower panel (not shown) at the front end thereof and the rear floor panel 8 at the rear end thereof. The floor tunnel reinforcement 10 has side skirts welded, or otherwise secured, to the center floor panel 1 at opposite wall sections forming the floor tunnel 2. As seen in FIG. 2, the floor tunnel reinforcement 10 has a cross sectional configuration that cooperates to form two parallel closed cross sections 11 extending in the lengthwise direction between the top of the floor tunnel 2. This configuration of the floor tunnel reinforcement 10 provides improvement of structural rigidity of the floor, and hence the vehicle body.

The rear body further includes cross beams, namely generally U-shaped center cross beams 12 and 13 straddling the floor tunnel 2 and a generally L-shaped rear cross beam 14, that work as rigid structural members of the vehicle body. The front cross beams 12 and 13 are separated in the lengthwise direction and are welded, or otherwise secured, to the center floor panel 1 so as to form closed cross sections extending in the transverse direction. The rear cross beam 14 extends under the between the rear floor panel 8 and the kick-up joint panel 9 and is welded, or otherwise secured, to the rear floor panel 8 and the kick-up joint panel 9 from the underside so as thereby to interconnect the side frames 7 and to form a closed cross section 15 extending in the transverse direction as shown in FIG. 2.

The rear body further includes a pair of generally-U shaped floor beams 18 that extend in the lengthwise direction and are welded, or otherwise secured, to the floor panel 1 on opposite sides of the floor tunnel 2 and from the under side of the floor panel 2 so as thereby to form closed cross sections therebetween. The rear body at each of opposite sides is provided with a wheel house 19 for receiving a rear wheel (not shown) therein and a package member 21, that works as a rigid structural member, extending in the transverse direction and interconnecting body side walls 20. These wheel house and package member 21 are joined by a package reinforcement 22 extending vertically. The package reinforcement 22 has flanges 22a and 22b through which the package reinforcement 22 is welded, or otherwise secured, to the body side wall 20 and a flange 22c through which the package reinforcement 22 is welded, or otherwise secured, to the wheel house 19 at upper and vertical portions.

The rear body has a baggage room defined between the rear floor panel 8 and a rear package reinforcement 25 The rear package reinforcement 25 is installed horizontally between the package member 21 and a rear package member 24 extending along lower transverse edge of a rear windshield 23. There is provided a generally L-shaped cross beam 26 extends under the connected section between the package member 21 and rear package reinforcement 25 and is welded, or otherwise secured, to the connected section between the package member 21 and rear package reinforcement 25 from the underside so as thereby to form a closed cross section 27 extending in the transverse direction as shown in FIG. 2.

Figure 4:
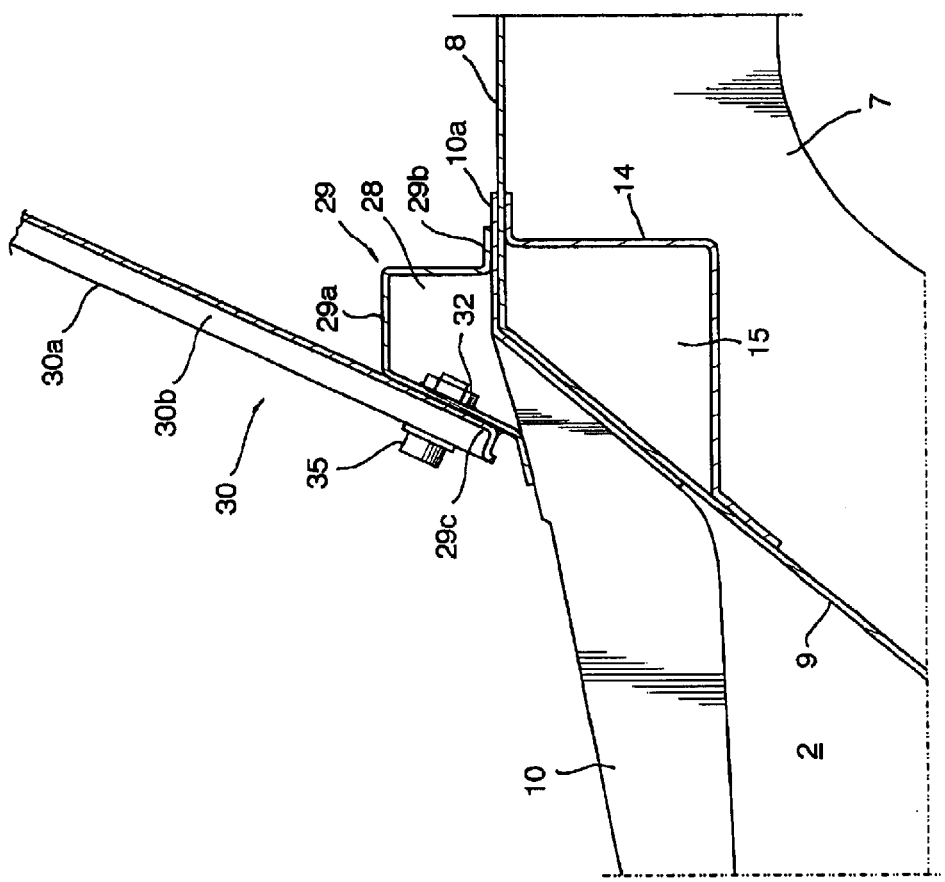
FIG. 4 is an enlarged view of an essential part of the rear body structure.
Figure 5:
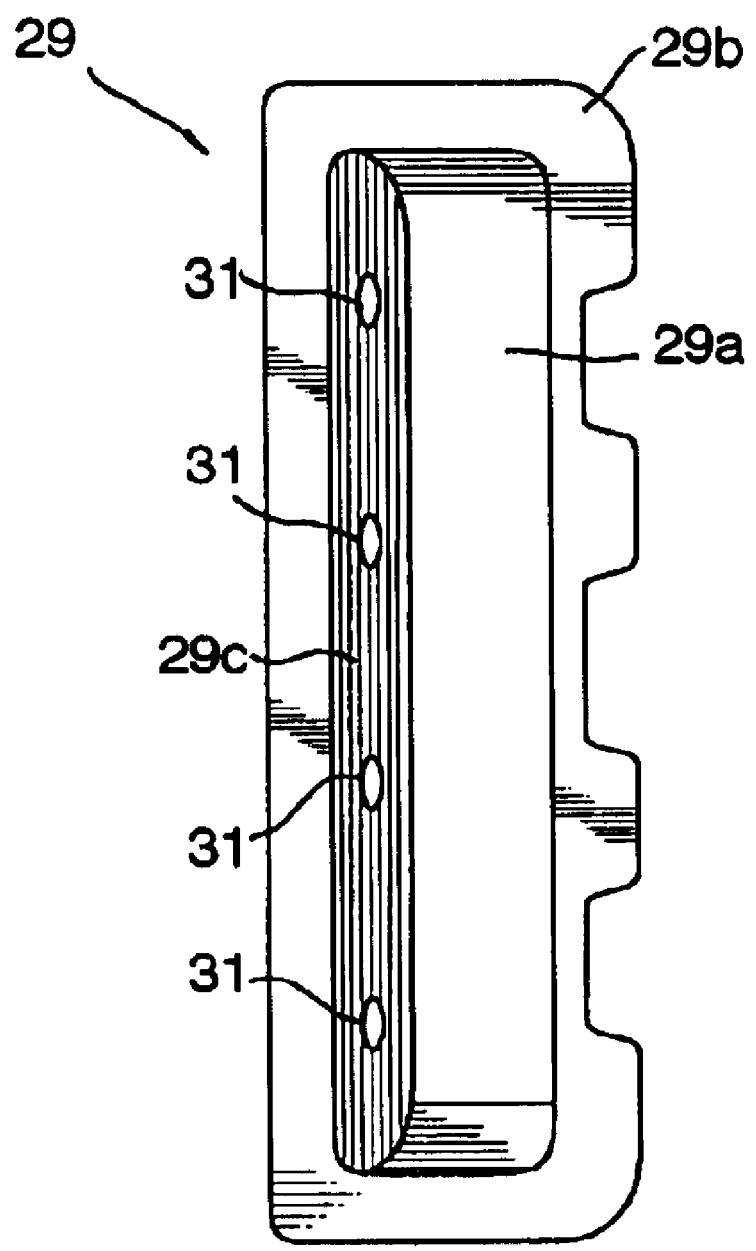
FIG. 5 is a plan view of a bracket.

As shown in FIGS. 4 and 5, the floor tunnel reinforcement 10 has a rear joint flange 10a that is welded, or otherwise secured, to a front end portion of the rear floor panel 8 from the upper side The rear joint flange 10a is provided with a bracket 29 welded, or otherwise secured, thereto so as to form a closed cross section 28 extending in the transverse direction and located correspondingly to the closed cross section 15 formed by the rear cross beam 14. As shown in detail in FIG. 5, the bracket 29 is formed as an integral piece and comprises a generally rectangular box-shaped body 29a and a peripheral flange 29b. The generally rectangular box-shaped body 29a has a front wall 29c at least at a front side. The front wall 29c is slanted at an angle equal to an angle at which a generally V-shaped gusset 30, which will be described in more detail later, is installed and has a plurality of holes 31. As shown in FIG. 4, a plurality of screw nuts 32 are welded to the slanted front wall 29c from the interior of the rectangular box-shaped body 29a so as to be in alignment with the holes 31, respectively. A screw bolt 35 is fastened into the screw nut 32 to fix the lower portion of the generally V-shaped gusset 30 to the bracket 29.

Figure 6:
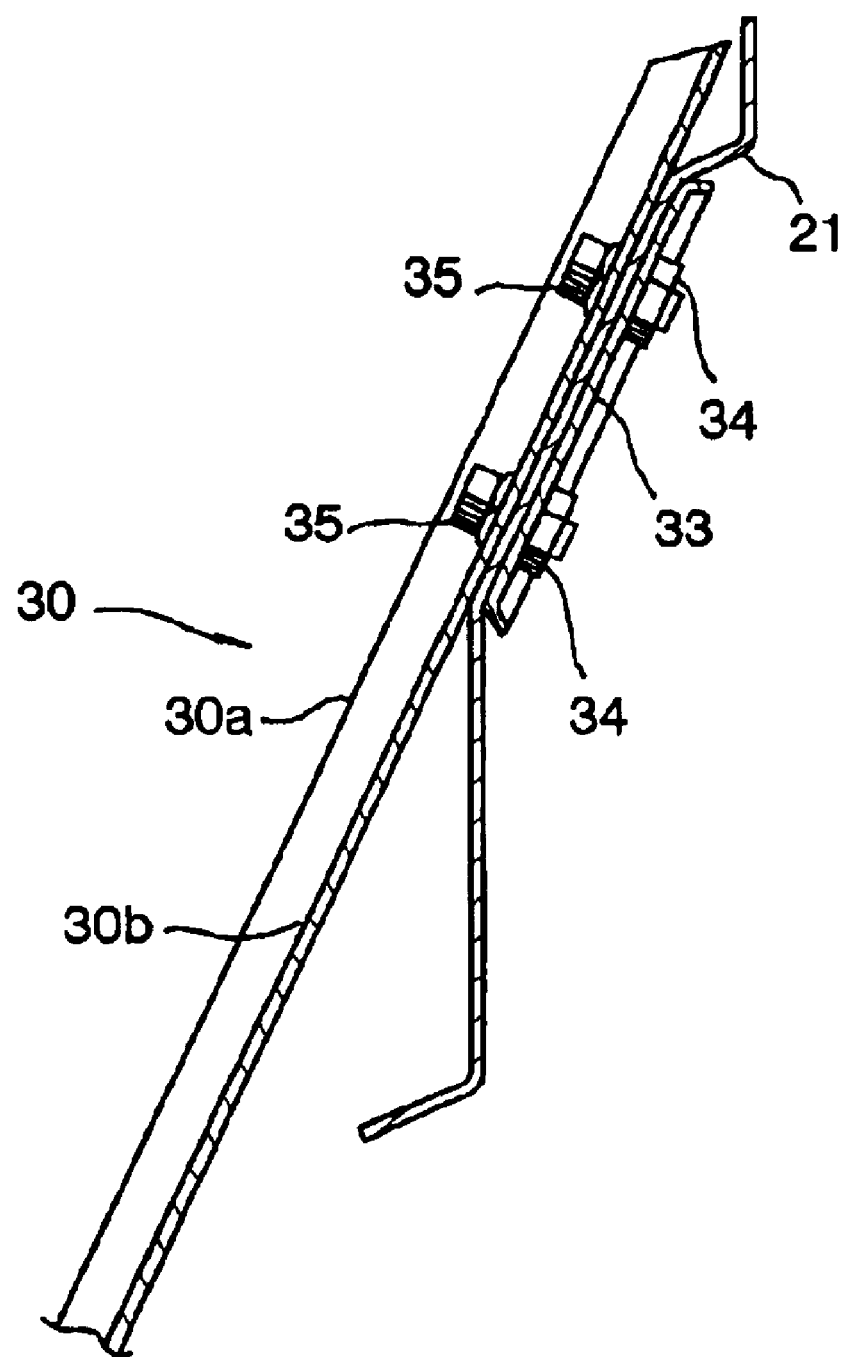
FIG. 6 is an enlarged view of an essential part of the rear body structure.

As shown in FIGS. 3 and 6, the package member 21 at opposite ends in the transverse direction is provided with brackets 33 welded, or otherwise secured, thereto from the back side. A plurality of screw nuts 34 are welded to each of the brackets 33 from the backside thereof A screw bolt 35 is fastened into the screw nut 34 to fix the upper portion of the generally V-shaped gusset 30 to the package member 21 through the bracket 33. In a nutshell, the floor tunnel reinforcement 10 and the package member 21 are rigidly interconnected by the generally V-shaped gusset 30 connected to the floor tunnel reinforcement 10 through the bracket 29 and the floor tunnel reinforcement 10 is rigidly connected to the rear cross beam 14 through the joined section between the rear floor panel 8 and the kick-up joint panel 9. Further, the bracket 29 having the closed cross section 28 is located right above the rear cross beam 14 having the closed cross section 15.

Figure 7:
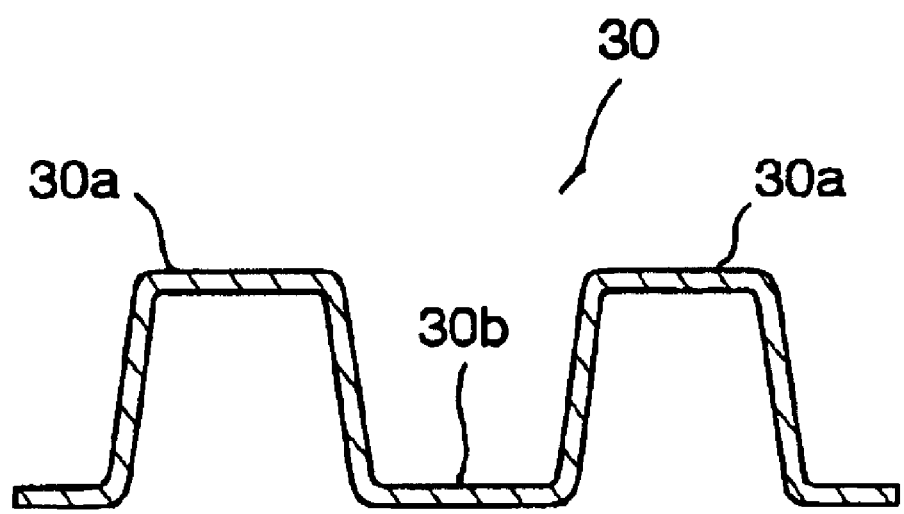
FIG. 7 is a cross sectional view of the bracket.

Referring to FIG. 7, the generally V-shaped gusset 30 has a generally W-shaped cross section. Specifically, the generally V-shaped gusset 30 has a gusset reinforcement comprising two convex beads 30a that are separated by a groove 30b and run the entire length of the generally V-shaped gusset 30. This configuration provides enhanced rigidity for the generally V-shaped gusset 30.

The rear body shown in FIGS. 1 through 7 by way of example and described above has the structure that comprises the floor tunnel 2 extending in the lengthwise direction of the vehicle body at the middle of the floor panel 1, the floor tunnel reinforcement 10 disposed along the floor tunnel so as to form a closed cross section 11 between them, and a gusset interconnecting the floor tunnel reinforcement and the package member extending in the transverse direction between and interconnecting side walls between which a compartment is formed in the rear body.

According to the rear body structure having the floor tunnel reinforcement 10 as a rigid structural member and the package member 21 which are connected by the gusset 30, an external load applied to the floor tunnel reinforcement 10 is transmitted to an upper body portion of the vehicle body through the gusset 30 and the package member 21. This improves the property of dispersing an external load applied to the vehicle body in addition to the rigidity of both vehicle floor, and hence the vehicle body. Furthermore, the gusset 30 thus installed to the rear body provides an increase in the torsional rigidity of the vehicle body.

The rear body structure has the bracket 29 secured to the floor tunnel reinforcement 10 so that the gusset 30 is connected to the floor tunnel reinforcement 10. This improves assembling workability and fitting suitability of the gusset 30.

The rear body structure has the cross beam 14 to which the floor tunnel reinforcement 10 is connected so that the bracket 29 forms a closed cross section 28 between the floor tunnel reinforcement 10 right above the cross beam 14. This provides a double closed section structure comprising closed cross sections 15 and 28 formed by the rear cross beam 14 and the bracket 29 which improves rigidity of the joined section of the gusset 30. In addition, the gusset 30 has a generally V-shaped form and is provided with V-shaped beads 30a. The V-shaped gusset 30 thus formed improves its own rigidity, so as to increase external load transmission efficiency and, in consequence, to provide enhanced torsional rigidity of the vehicle body. Furthermore, the V-shaped gusset 30 is secured to the package member 21 at opposite ends in the transverse direction, so as to increase more the external load transmission efficiency.

Figure 8:
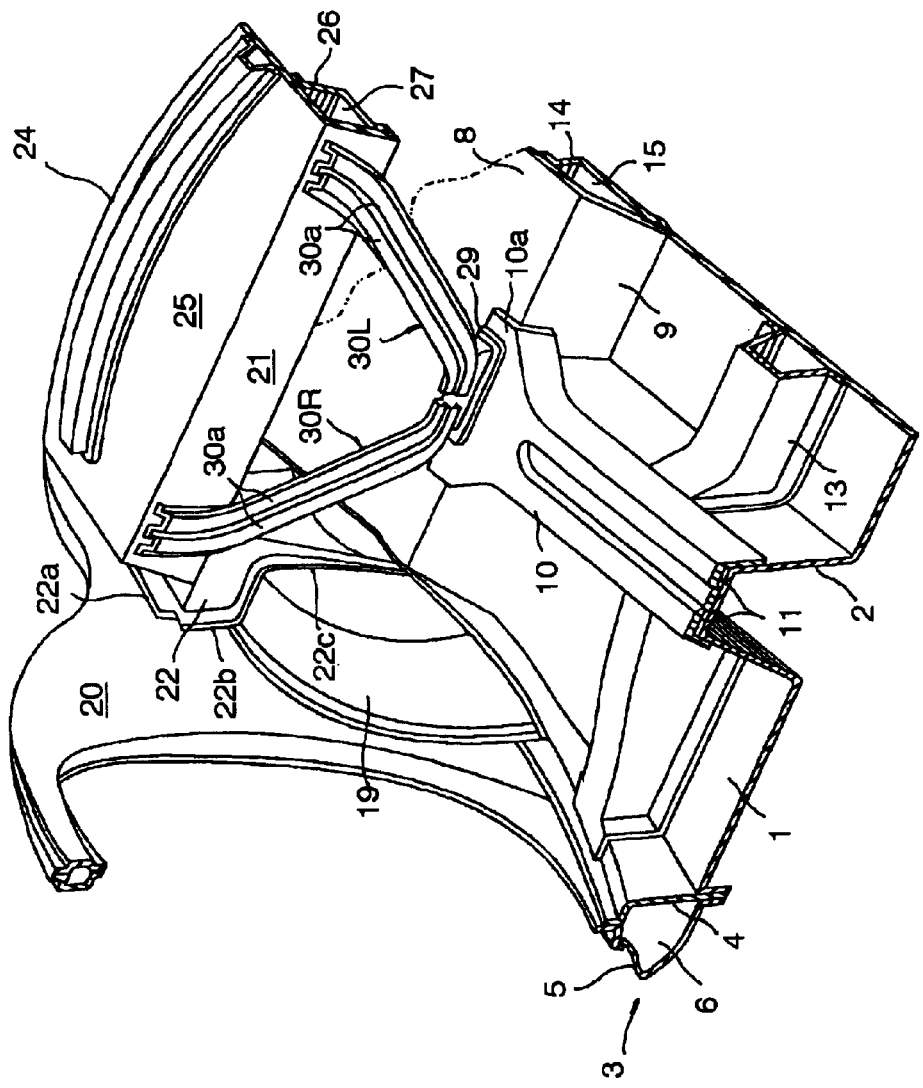
FIG. 8 is a plan view of a rear body structure according to another embodiment of the present invention.

FIG. 8 shows a rear body for a vehicle body according to another embodiment of the present invention. The rear body of this embodiment is different from the previous embodiment only in that a V-shaped gusset 30 is made of two mating gusset halves, namely a right gusset half 30R and a left gusset half 30L. Specifically, the right gusset half 30R has two convex beads separated in parallel with each other and running the entire length of the right gusset half 30R. The left gusset half 30L has two convex beads separated in parallel with each other and running the entire length of the left gusset half 30L. Each of the gusset halves 30R and 30L has a gusset reinforcement comprising two beads 30a that are separated by a groove and run the entire length of the gusset half 30R, 30L. The right gusset half 30R at opposite ends is welded, or otherwise secured, to both top of the bracket 29 secured to the floor tunnel reinforcement 10 and right end portion of the package member 21. Similarly, the left gusset half 30L at opposite ends is welded, or otherwise secured, to both top of the bracket 29 secured to the floor tunnel reinforcement 10 and left end portion of the package member 21.

The V-shaped gusset 30 made of the two mating gusset halves 30R and 30R excels at workability in addition to having the same effect as the integral piece of V-shaped gusset 30 of the previous embodiment.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A structure of a rear body for a vehicle body comprising:

a floor tunnel extending in a lengthwise direction from the front to the back of the vehicle body at a middle of a floor panel in a transverse direction of the vehicle body;

a floor tunnel reinforcement disposed along the floor tunnel so as to form a closed cross section between them;

a package member extending in the transverse direction so as to interconnect side walls between which a compartment is formed in the rear body;

a gusset secured to the floor tunnel reinforcement and the package member so as thereby to interconnect the floor tunnel reinforcement and the package member;

a bracket secured to the floor tunnel reinforcement; and a cross member forming a closed cross section extending in said transverse direction;

wherein said gusset is secured to the floor tunnel reinforcement through said bracket and said cross member is secured to the floor tunnel reinforcement.

2. A structure of a rear body as defined in claim 1, wherein said bracket is shaped so as to form a closed cross section between said floor tunnel reinforcement.

3. A structure of a rear body for a vehicle body comprising:

a floor tunnel extending in a lengthwise direction from the front to the back of the vehicle at a middle of a floor panel in a transverse direction of the vehicle body;

a floor tunnel reinforcement disposed along the floor tunnel so as to form a closed cross section between them;

a package member extending in the transverse direction so as to interconnect side walls between which a compartment is formed in the rear body;

a bracket secured to the floor tunnel reinforcement; and a gusset secured to the floor tunnel reinforcement through said bracket and the package member so as thereby to interconnect the floor tunnel reinforcement and the package member;

wherein said gusset is generally V-shaped and has a gusset reinforcement running the entire length thereof.

4. A structure of a rear body as defined in claim 3, wherein said gusset reinforcement comprises a bead.

5. A structure of a rear body as defined in claim 3, wherein said V-shaped gusset comprises two mating gusset halves.

6. A structure of a rear body as defined in claim 5, wherein each said gusset halves has a gusset reinforcement running the entire length thereof.

7. A structure of a rear body as defined in claim 6, wherein said gusset reinforcement comprises a bead.

\* \* \* \* \*